(12) United States Patent
Cohen

(10) Patent No.: US 8,264,487 B2
(45) Date of Patent: Sep. 11, 2012

(54) METHOD FOR CONVERTING POLYGONAL SURFACES TO LEVELSETS

(75) Inventor: Jonathan Cohen, Ann Arbor, MI (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1113 days.

(21) Appl. No.: 12/110,963

(22) Filed: Apr. 28, 2008

(65) Prior Publication Data

US 2008/0266293 A1   Oct. 30, 2008

Related U.S. Application Data

(60) Provisional application No. 61/036,738, filed on Mar. 14, 2008, provisional application No. 60/926,593, filed on Apr. 27, 2007.

(51) Int. Cl.
*G06T 17/00* (2006.01)

(52) U.S. Cl. ......................... 345/424; 345/953

(58) Field of Classification Search .................. 345/424, 345/953
See application file for complete search history.

(56) References Cited

U.S. PATENT DOCUMENTS

| | | | |
|---|---|---|---|
| 4,928,250 A * | 5/1990 | Greenberg et al. | 345/426 |
| 6,040,835 A * | 3/2000 | Gibson | 345/424 |
| 6,084,979 A * | 7/2000 | Kanade et al. | 382/154 |
| 6,115,048 A * | 9/2000 | Cline et al. | 345/424 |
| 6,219,060 B1 * | 4/2001 | Ludke et al. | 345/424 |
| 6,867,774 B1 | 3/2005 | Halmshaw et al. | |
| 7,012,604 B1 * | 3/2006 | Christie et al. | 345/426 |
| 7,091,973 B1 * | 8/2006 | Cohen | 345/426 |
| 2003/0001859 A1 * | 1/2003 | Sloan et al. | 345/584 |
| 2004/0170302 A1 * | 9/2004 | Museth et al. | 382/107 |
| 2005/0093878 A1 * | 5/2005 | Sloan et al. | 345/584 |
| 2005/0110751 A1 * | 5/2005 | Wilson et al. | 345/156 |

(Continued)

OTHER PUBLICATIONS

Uitert et al; Automatic correction of level set based subvoxel accurate centerlines for virtual colonoscopy; Apr. 9, 2006; Biomedical Imaging: Nano to Macro, 2006, 3rd IEEE International Symposium; pp. 303-306.*

(Continued)

*Primary Examiner* — David T Welch
(74) *Attorney, Agent, or Firm* — Fitch, Even, Tabin & Flannery, LLP

(57) ABSTRACT

A method for use in computer graphics includes receiving data defining an explicit surface representation of three-dimensional (3D) geometry and casting a ray into the explicit surface representation. For each point where the ray intersects the explicit surface, a direction of the ray is compared to a direction of a surface normal of the explicit surface at that point, and then a count is incremented or decremented based on a first rule that uses a result of the comparison at that point. Then, for one or more voxels corresponding to the ray, data is generated for each voxel that indicates the voxel is either inside or outside of the explicit surface based on a second rule that uses a value of the count at that voxel. Another method includes defining a narrow band of voxels near the explicit surface, and then for each voxel in the narrow band, approximating a distance between the voxel and a closest point on the explicit surface by assuming a set of two-dimensional (2D) distances associated with the voxel and a portion of the explicit surface form a triangle. For each voxel outside of the narrow band, a distance to a closest point on the explicit surface is approximated by interpolating the approximated distances in the narrow band.

6 Claims, 7 Drawing Sheets

U.S. PATENT DOCUMENTS

| | | | |
|---|---|---|---|
| 2005/0119858 A1* | 6/2005 | Breneman | 702/155 |
| 2005/0128195 A1* | 6/2005 | Houston et al. | 345/419 |
| 2006/0155418 A1* | 7/2006 | Bradbury et al. | 700/182 |
| 2006/0275015 A1* | 12/2006 | Bierhoff | 385/147 |
| 2007/0236499 A1* | 10/2007 | Mihara et al. | 345/441 |

OTHER PUBLICATIONS

Krahnstoever et al.; Computing curvature-adaptive surface triangulations of three-dimensional image data; Dec. 18, 2003; Springer-Verlag; vol. 20; pp. 17-36.*

U.S. Appl. No. 61/036,738, filed Mar. 14, 2008; Inventor Jonathan Cohen; entitled "Method for Converting Polygonal Surfaces to Levelsets"; all pages [86598].

U.S. Appl. No. 60/926,593, filed Apr. 27, 2007; Inventors Ferreira et al; entitled "Levelsets in Productions: Spiderman 3"; all pages.

U.S. Appl. No. 60/926,490, filed Apr. 27, 2007; Inventor Magnus Wrenninge; entitled "Black-Box Adaptive Raymarching (SAP 0256)"; all pages.

* cited by examiner

METHOD FOR CONVERTING POLYGONAL SURFACES TO LEVELSETS

CROSS-REFERENCE TO RELATED APPLICATIONS

This application claims the benefit of both U.S. Provisional Patent Application No. 61/036,738, filed Mar. 14, 2008, entitled "METHOD FOR CONVERTING POLYGONAL SURFACES TO LEVELSETS," and U.S. Provisional Patent Application No. 60/926,593, filed Apr. 27, 2007, entitled "LEVELSETS IN PRODUCTIONS: SPIDERMAN 3," the entire disclosures of which are both hereby fully incorporated herein by reference in their entireties.

BACKGROUND OF THE INVENTION

1. Field of the Invention

The present invention relates generally to computer graphics and animation, and more specifically to three-dimensional (3D) scan conversion.

2. Discussion of the Related Art

In three-dimensional (3D) computer graphics, a polygon mesh is a collection of vertices and polygons that defines the shape of an object. Such meshes usually consist of triangles or other simple polygons. The model formed by a polygon mesh is typically rendered to generate an image on a screen.

SUMMARY OF THE INVENTION

One embodiment provides a method for use in computer graphics, comprising: receiving data defining an explicit surface representation of three-dimensional (3D) geometry; casting a ray into the explicit surface representation; for each point where the ray intersects the explicit surface, comparing a direction of the ray to a direction of a surface normal of the explicit surface at that point; for each point where the ray intersects the explicit surface, incrementing or decrementing a count based on a first rule that uses a result of the comparison at that point; and for one or more voxels corresponding to the ray, generating data for each voxel that indicates the voxel is either inside or outside of the explicit surface based on a second rule that uses a value of the count at that voxel.

Another embodiment provides a method for use in computer graphics, comprising: receiving data defining an explicit surface representation of three-dimensional (3D) geometry; defining a narrow band of voxels near the explicit surface; for each voxel in the narrow band, approximating a distance between the voxel and a closest point on the explicit surface by assuming a set of two-dimensional (2D) distances associated with the voxel and a portion of the explicit surface form a triangle; and for each voxel outside of the narrow band, approximating a distance to a closest point on the explicit surface by interpolating the approximated distances in the narrow band.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Figure 1:
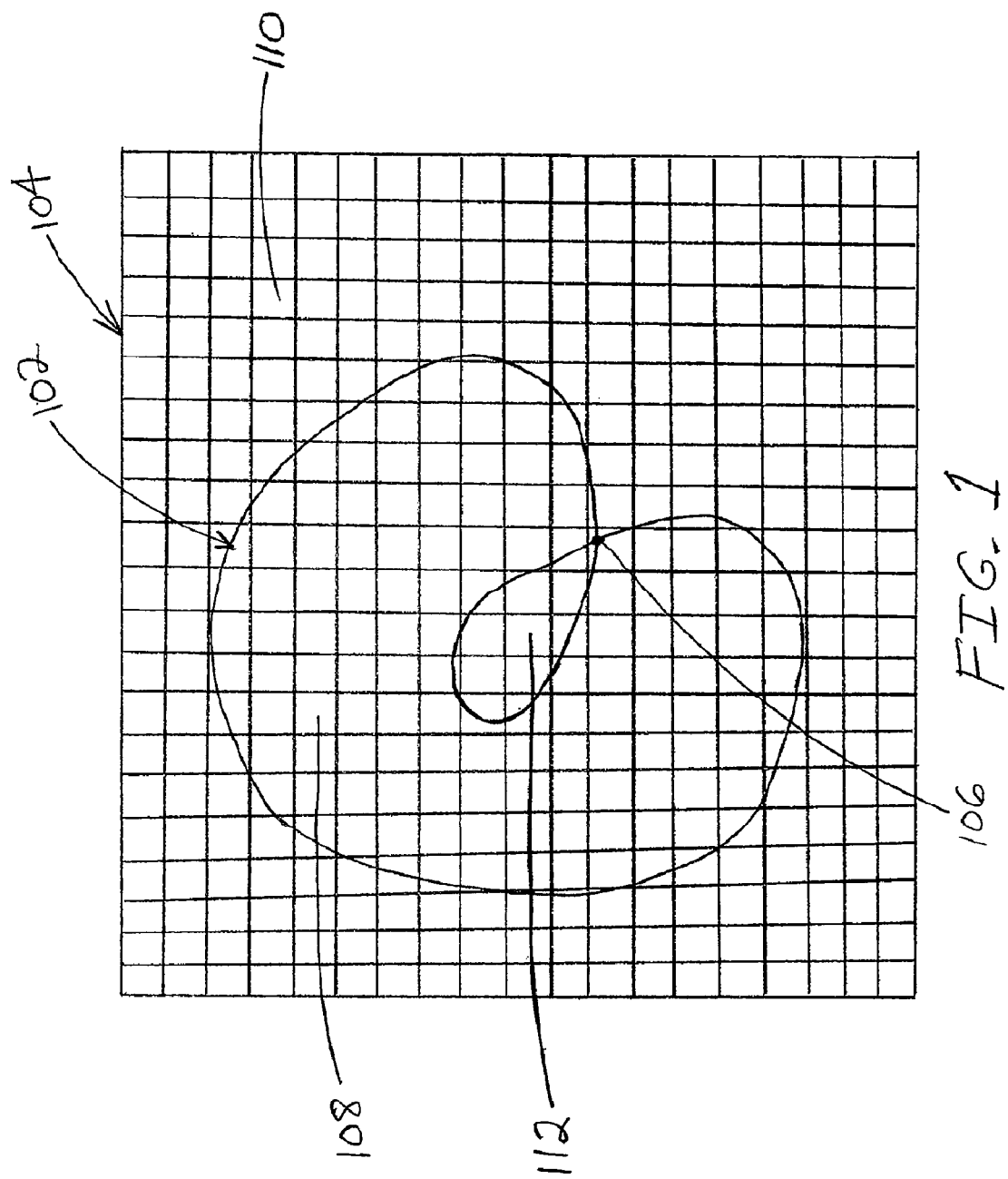
FIG. 1 is a voxel grid diagram illustrating a polygonal surface superimposed thereon.

An explicit surface representation is a representation in which the surface is actually modeled, such as a polygon mesh. Such a surface representation of three-dimensional (3D) geometry is sometimes called a boundary representation (or b-rep). An implicit surface representation is defined by an implicit function, which is a function that takes on a given constant value. A level set is a type of implicit surface. More specifically, a level set is an implicit function stored on a regular grid.

A signed distance function (SDF) is a type of function that is often used with a level set. An SDF provides two types of information. First, the sign of the value in each grid cell (or voxel) indicates whether the cell is inside the surface or outside the surface. For example, a positive number indicates the cell is inside the surface, a negative number indicates the cell is outside the surface, and zero indicates the cell is on the surface. Second, the value in each grid cell provides the distance between the grid cell and the closest point on the surface of the shape. That is, an SDF provides a table of values with the values being the distance to the closest point on the surface of the shape. Thus, an SDF is a distance function and indicates whether the point is inside or outside.

Contouring is a process that converts an implicit function to an explicit surface. In contrast, three-dimensional (3D) scan conversion is a process of taking an explicit surface and representing it as an implicit function. For example, a 3D scan conversion algorithm may be used to convert 3D geometry from a surface representation into a discrete volumetric representation stored over a regular 3D grid of voxels. A level set is one such discrete volumetric representation.

Thus, 3D scan conversion may be used for converting geometry represented as a polygonal mesh into an equivalent shape represented as a level set. In practice, for example, a character may be animated, and then post processing used to convert it to a level set. In this way, a given a set of polygons are represented on a regular grid.

While level sets are a relatively new technology in computer graphics, it is believed that they will be used more in the future. This is because, for example, in computer animations level sets may be used for collision detection. That is, level sets may be used to easily determine when one body or particle collides with another. It is believed that several software animation tools have or will soon add support for level sets, and that more physical simulation and effects (FX) tools will use level sets as their building blocks in the future. Therefore, an ability to efficiently generate level sets is relevant to many different users of this technology.

One of the challenges in performing 3D scan conversion is determining whether each voxel in the grid is inside or outside the surface. There are previous algorithms for performing 3D scan conversion that rely on so-called "ray stabbing" or "ray casting," which involves tracing a ray through the voxel grid and counting how many times it intersects a surface. An odd number of surface intersections indicates the voxel is inside, and an even number of surface intersections indicates the voxel is outside. Given these counts, one can determine whether each voxel is inside or outside the surface, and a volumetric description can be built.

Previous 3D scan conversion algorithms, however, tend to produce inaccurate, inconsistent and/or unpredictable results for self-intersecting input polygonal surfaces. Self-intersecting polygonal surfaces are quite common in the animation process. Processing such surfaces with previous 3D scan conversion algorithms often produces undesirable artifacts.

Embodiments of the present invention provide methods and techniques for converting geometry represented as a polygonal mesh into an equivalent shape represented as a level set. One embodiment provides a method for converting polygonal surfaces to level sets. The method performs well even for self-intersecting input polygonal surfaces. Namely, the method is an improvement over previous methods because it is robust even when the model is self-intersecting. The result is that an animated surface with self-intersections can be converted into a level set without any artifacts, which is something that prior algorithms could not do. In some embodiments, the method works best when the surface has no holes.

A first aspect of a method in accordance with an embodiment of the present invention involves determining whether each voxel in the grid is inside or outside the surface. This determination is referred to herein as disambiguating inside or outside.

In order to illustrate what is to be determined, FIG. 1 illustrates a polygonal surface 102 superimposed over a regular grid of voxels 104. The polygonal surface 102 self-intersects at point 106. Initially, for example, it appears that voxel 108 is inside the surface 102, and that voxel 110 is outside the surface 102. But a more difficult determination is whether voxel 112 is inside or outside. The method according to the present embodiment makes this determination in a consistent manner. Then the resulting data can be used to form a level set representing the polygonal surface 102.

Disambiguating inside or outside according to the present embodiment is accomplished by casting or stabbing a ray into the surface and looking at the surface normal of each surface that the ray intersects. A count is accumulated based on the direction of the surface normal of each intersected surface. The accumulated count, which may be referred to herein as the "cardinality," indicates how much the voxel is inside or outside.

For example, in one embodiment the accumulated count starts with zero before the ray intersects a surface. Each time the ray intersects a surface in which the surface normal is pointing in the direction opposite the ray, the accumulated count increases by one. Each time the ray intersects a surface in which the surface normal is pointing in the same direction as the ray, the accumulated count decreases by one. When the accumulated count is positive, the voxel is considered to be inside. When the accumulated count is zero or negative, the voxel is considered to be outside.

Figure 2:
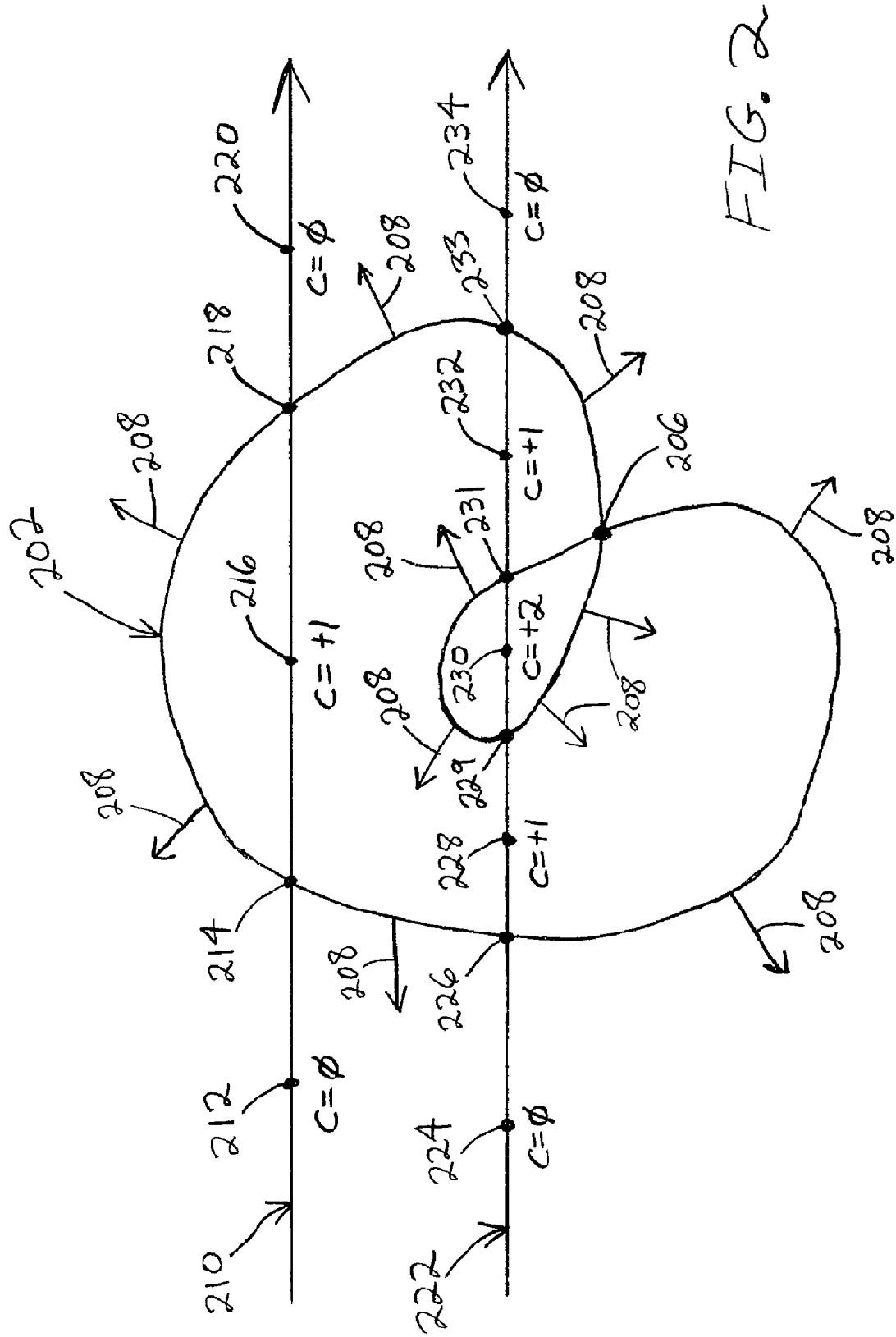
FIGS. 2 and 3 are diagrams illustrating a method for use in disambiguating inside/outside in accordance with an embodiment of the present invention.

FIG. 2 illustrates an example of this process of disambiguating inside or outside in accordance with an embodiment of the present invention. A polygonal surface 202 is illustrated that self-intersects at point 206. Several arrows 208 indicate the directions of the surface normals.

In this embodiment, the polygonal surface 202 is processed one scan line at a time. Namely, a ray may be cast for each scan line to process a single line at a time. This way, the processing starts with a row of voxels and marches across, and then moves to the next row of voxels. However, this is not required and rays may be cast from other directions.

As a first example, a ray 210 is cast into the polygonal surface 202. At point 212, prior to intersecting a surface, the accumulated count is equal to zero, i.e. c=0. At point 214 the ray 210 intersects a surface. The normal of that surface is pointing in the opposite direction that the ray 210 is marching. Because the normal of that surface is pointing in the opposite direction of the ray 210, the accumulated count increases by one. Therefore, after the intersection, such as at point 216 the accumulated count is equal to positive one, i.e. c=+1. Because the accumulated count is positive at this point, the voxel that includes or corresponds to the point is considered to be inside.

At point 218 the ray 210 intersects another surface. Because the normal of that surface is pointing in the same direction of the ray 210, the accumulated count decreases by one. Therefore, at point 220 the count is equal to zero, i.e. c=0. Because the accumulated count is zero at this point, the voxel is considered to be outside.

As another example, a ray 222 is cast into a different portion of the polygonal surface 202. At point 224, prior to intersecting a surface, the accumulated count is equal to zero, i.e. c=0. At point 226 the ray 222 intersects a surface. Because the normal of that surface is pointing in the opposite direction of the ray 222, the accumulated count increases by one. Therefore, after the intersection, such as at point 228, the accumulated count is equal to positive one, i.e. c=+1. Because the accumulated count is positive at this point, the voxel is considered to be inside.

At point 229 the ray 222 intersects another surface. The normal of that surface is again pointing in the opposite direction of the ray 222, and so the accumulated count again increases by one. Therefore, at point 230 the accumulated count is equal to positive two, i.e. c=+2. Because the accumulated count is still positive at this point, the corresponding voxel is still considered to be inside.

At point 231 the ray 222 intersects another surface. Because the normal of that surface is pointing in the same direction of the ray 222, the accumulated count decreases by one. Therefore, at point 232 the count is equal to positive one, i.e. c=+1. Because the accumulated count is still positive at this point, the voxel is still considered to be inside.

At point 233 the ray 222 intersects another surface. Because the normal of that surface is pointing in the same direction of the ray 222, the accumulated count again decreases by one. Therefore, at point 234 the count is equal to zero, i.e. c=0. Because the accumulated count is zero at this point, the corresponding voxel is finally considered to be outside.

A different result would be achieved for ray 222 if conventional ray stabbing were used. Namely, point 230 would be considered to be outside rather than inside. This is because at that point an even number of surfaces had been intersected by the ray 222. Designating point 230 as outside may cause an internal open pocket or bubble to be formed in the animation. The system creating the animation will think the area of the bubble is outside and cause that area to respond as if it is outside. This may cause undesirable results because the self-intersection of the surface at point 206 may have been unintentional. This may occur, for example, if the polygonal surface 202 represents the armpit of a character. Therefore, designating point 230 as inside, such as is done by the above-described embodiment of the present invention, achieves a better result by avoiding the occurrence of internal bubbles or open pockets due to the unintentional self-intersection.

Figure 3:
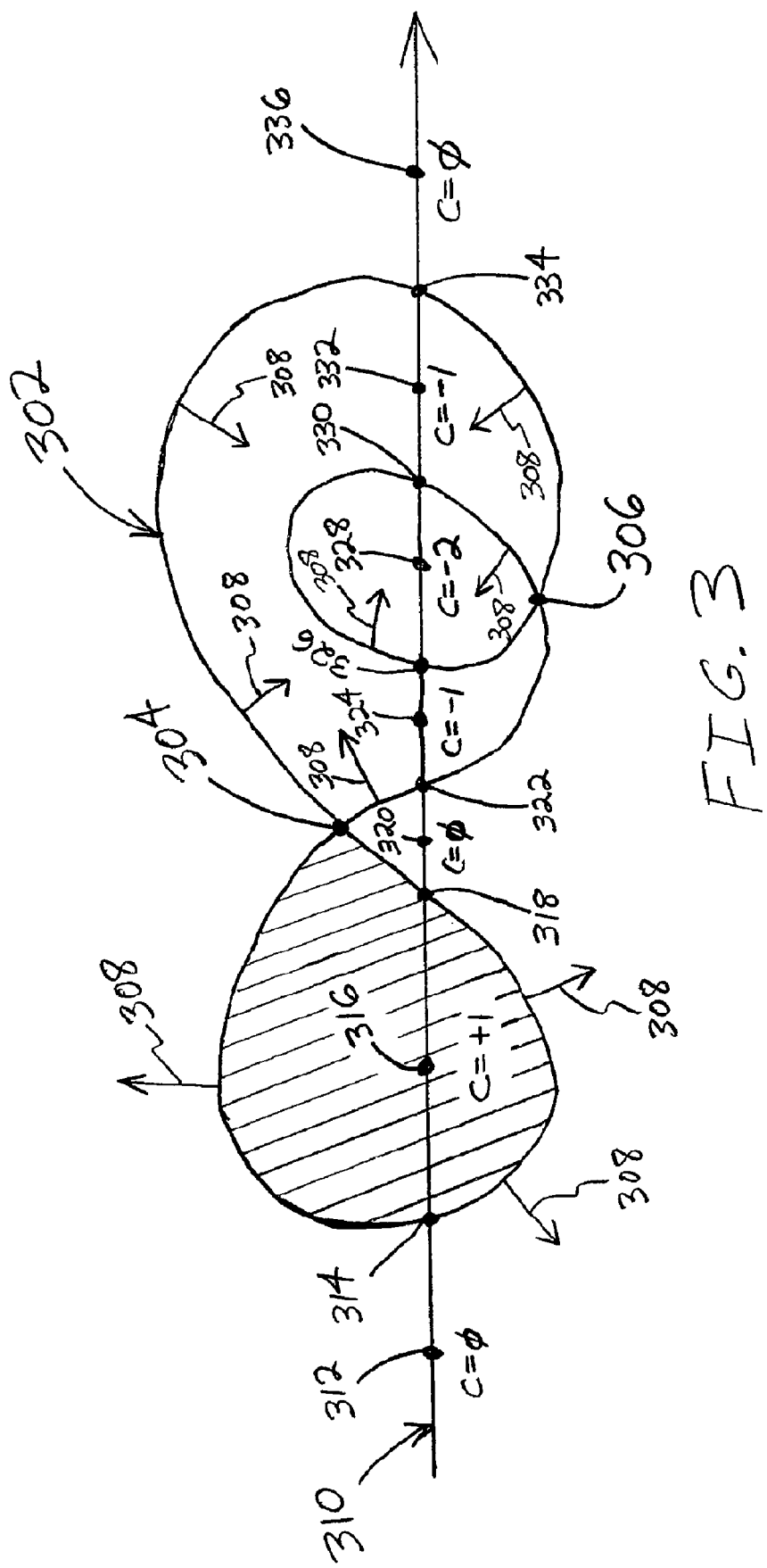

FIG. 3 illustrates another example of a process of disambiguating inside or outside in accordance with an embodiment of the present invention. A polygonal surface 302 is illustrated that self-intersects at points 304 and 306. Several arrows 308 indicate the directions of the surface normals.

A ray 310 is cast into the polygonal surface 302. At point 312, prior to intersecting a surface, the accumulated count is equal to zero, i.e. c=0. At point 314 the ray 310 intersects a surface. Because the normal of that surface is pointing in the opposite direction of the ray 310, the accumulated count increases by one. Therefore, at point 316 the accumulated count is equal to positive one, i.e. c=+1. Because the accumulated count is positive at this point, the corresponding voxel is considered to be inside.

At point 318 the ray 310 intersects another surface. Because the normal of that surface is pointing in the same direction of the ray 310, the accumulated count decreases by one. Therefore, at point 320 the count is equal to zero, i.e. c=0. Because the accumulated count is zero at this point, the voxel is considered to be outside.

At point 322 the ray 310 intersects another surface. The normal of that surface is again pointing in the same direction of the ray 310, and so the accumulated count again decreases by one. Therefore, at point 324 the accumulated count is equal to negative one, i.e. c=−1. Because the accumulated count is negative at this point, the voxel is still considered to be outside.

At point 326 the ray 310 intersects another surface. The normal of that surface is again pointing in the same direction of the ray 310, and so the accumulated count again decreases by one. Therefore, at point 328 the accumulated count is equal to negative two, i.e. c=−2. Because the accumulated count is negative at this point, the voxel is still considered to be outside.

At point 330 the ray 310 intersects another surface. The normal of that surface is pointing in the opposite direction of the ray 310, and so the accumulated count increases by one. Therefore, at point 332 the accumulated count is equal to negative one, i.e. c=−1. Because the accumulated count is still negative at this point, the voxel is still considered to be outside.

At point 334 the ray 310 intersects another surface. The normal of that surface is again pointing in the opposite direction of the ray 310, and so the accumulated count increases by one. Therefore, at point 336 the accumulated count is equal to zero, i.e. c=0. Because the accumulated count is zero at this point, the voxel is still considered to be outside.

Thus, the only portion of the polygonal surface 302 that is considered to be inside is the cross-hatched region that includes point 316. This provides a smoothly varying and consistent result.

In the above described embodiment, a positive accumulated count indicates inside, and a negative or zero accumulated count indicates outside.

However, some embodiments of the present invention may apply different rules. For example, in some embodiments only an accumulated count of zero may indicate outside, and both positive and negative accumulated counts may indicate inside. If such a rule were applied to the example in FIG. 3, then the result would be that points 316, 324, 328, and 332 would all be inside. Or, in some embodiments even accumulated counts may indicate outside and odd accumulated counts may indicate inside, or vice versa. Thus, any rule may be applied to achieve the desired result for inside/outside disambiguation.

Similarly, in the above described embodiment, a surface normal in the opposite direction of the cast ray increases the count, while a surface normal in the same direction of the ray decreases the count. However, in other embodiments of the present invention these rules may be reversed, such that a surface normal in the opposite direction of the cast ray decreases the count, while a surface normal in the same direction of the ray increases the count. Or, in some embodiments other rules may be applied.

Thus, the above-described embodiments use ray-stabbing and an analysis of surface normals to robustly and efficiently disambiguate between inside and outside in the case of self-intersections of polygonal surfaces. Previous methods, such as conventional ray-stabbing, do not robustly handle self-intersecting input polygonal surfaces, which limits their usefulness.

A second aspect of a method for converting polygonal surfaces to level sets involves determining the distance between each voxel in the grid and the closest point on the surface of the polygonal surface. This information, combined with the above-described determination of inside/outside, can be used to provide a level set and signed distance function (SDF). Namely, the value in each voxel provides the distance between the grid cell and the closest point on the surface of the shape, and the sign of the value indicates whether the point is inside or outside.

Figure 4A:
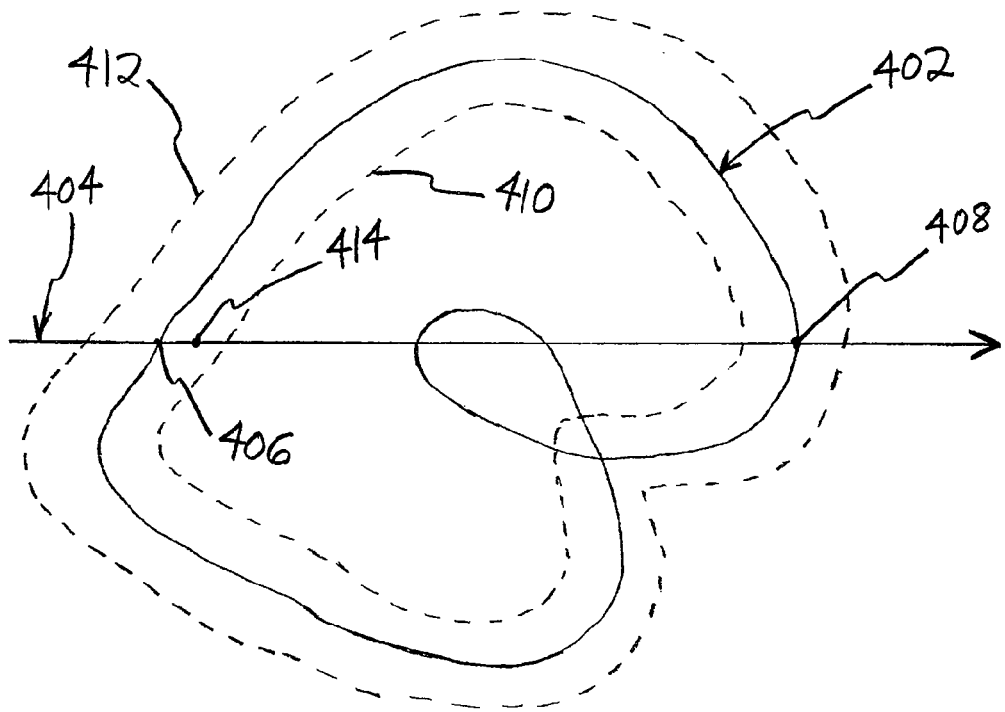
FIGS. 4A and 4B are diagrams illustrating a method for use in determining the distance between each voxel in a grid and the closest point on the polygonal surface in accordance with an embodiment of the present invention.
Figure 4B:
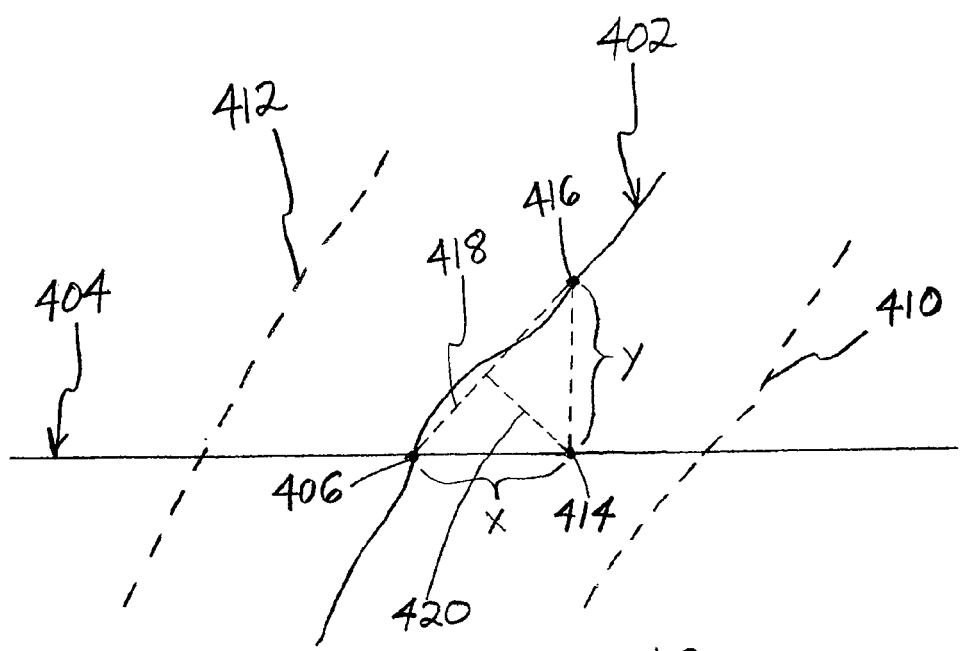

FIGS. 4A and 4B illustrate a method of determining such distances in accordance with an embodiment of the present invention. Specifically, FIG. 4A illustrates a polygonal surface 402. A ray 404 has been stabbed through the polygonal surface 402. Using the above-described techniques, it has been determined that the entire portion of the ray 404 between intersection points 406 and 408 is considered to be inside the surface 402.

In order to determine the distance between each voxel and the closest point on the surface of the polygonal surface 402, known distances are used to approximate the distance to the surface for voxels in a narrow band close to the surface, such as within a couple of grid cells to the surface. As an example, a narrow band close to the surface 402 has been defined and is indicated by the dashed lines 410 and 412. Point 414 is located on the ray 404 and in the narrow band close to the surface 402. The distance from point 414 to the closest point on the surface 402 will be calculated.

FIG. 4B illustrates a portion of the polygonal surface 402 in greater detail. The one-dimensional (1D) distance along the ray 404 between points 406 and 414, labeled x, may be obtained during the above-described process of disambiguating inside/outside. This is because as the system determines the ray cardinalities it keeps track of the distances along the ray 404 from the intersection 406. Namely, while marching along the ray 404, the system keeps track of the distances from the intersections. The system may keep track of the distances to the closest intersection.

Similarly, the 1D distance between points 414 and 416, labeled y, may also be obtained during the above-described process of disambiguating inside/outside. This is because the intersection point 416 was processed in a previous scan line, and the number of subsequent scan lines since that point will be known. Given that both the x and y distances are known, data is known in two-dimensions (2D).

Next, the 2D distances are used to estimate or approximate the actual 3D distance to the closest point on the surface. This is done by assuming that a straight line 418 approximates the portion of the polygonal surface 402 between points 406 and 416. This assumption is reasonable because the subject voxel at point 414 is located in a narrow band close to the surface 402, such as within a couple of grid cells to the surface. Because the line 418 and distances x and y form a triangle, known geometric calculations are used to calculate the shortest distance between point 414 and the line 418. This distance is represented by line 420 and is considered a good approximation of the distance between point 414 and the closest point on the surface of the polygonal surface 402. In this way, the 3D distances to the surface for voxels located in a narrow band close to the surface are synthesized based on the 2D distances. In some embodiments, the Adalsteinnson algorithm may be used to estimate the distances near the interface, or other methods involving the Pythagorean theorem may be used to perform the geometric calculations.

After the approximate 3D distances for voxels within the narrow band are calculated, then known methods, such as for example the Fast Marching Method, may be used to fill in the distances for all the other voxels in the grid. Namely, the Fast Marching Method may be used to interpolate the approximated 3D distances in the narrow band and propagate or sweep them to the other voxels in the grid and fill in the distances for those voxels. Thus, the distance between each of the remainder of the voxels outside the narrow band and their respective closest points on the surface of the polygonal surface 402 may be determined from the approximated distances in the narrow band. That is, it is enough to only know the 3D distances within a couple of grid cells to the surface.

Therefore, the 1D distances may be used to synthesize the 3D distances in the narrow band, and then the Fast Marching Method may be used to sweep the distances everywhere else in the grid. Using the single 1D distances at a single ray at a time to calculate the 3D distances in this manner is believed to be faster than calculating the 3D distances in a conventional manner. Furthermore, the described embodiment provides a full level set, with a true SDF, rather than just 2D distances in the x, y and z axes. That is, a true SDF is provided rather than keeping three distance fields separate.

It should be well-understood that the above-described method of disambiguating inside/outside, and the above-described method of calculating the distance between each voxel and the closest point on the surface, may either be used together or independently, in accordance with various embodiments of the present invention.

Therefore, methods and techniques for use in converting polygonal surfaces to level sets has been described. Namely, in the scan conversion process, given an explicit surface, the above-described methods and techniques may be used to build a level set that includes true SDFs. A level set is a function stored on a regular grid. With SDFs, each grid cell, or "voxel," includes a number. The sign (+/−) of the number indicates whether the voxel is located inside or outside of the surface. If the number is positive it is inside, if negative it is outside. The value of the number indicates the distance between the voxel and the surface.

Determining whether a voxel is inside or outside the surface (referred to as disambiguating inside/outside) is difficult for self-intersecting surfaces. A previous method is called "ray stabbing" or "ray casting," but it gives bad and/or inconsistent results for self-intersecting surfaces. In some embodiments of the present invention, disambiguating inside/outside may be performed by counting positive and negative cardinalities of ray intersections. That is, the directions of the surface normals of the surface may be used in the above-described method of disambiguating between inside/outside. This is believed to provide better results and consistency for self-intersecting surfaces. Then, the 2D distances may be used to approximate the 3D distances to the closest point on the surface for voxels in a narrow band close to the surface. The 3D distances to the closest point on the surface for all the remaining voxels may then be interpolated using known methods, such as the Fast Marching Method. The 3D distance information, along with the inside/outside information, may be used to build a level set.

Figure 5:
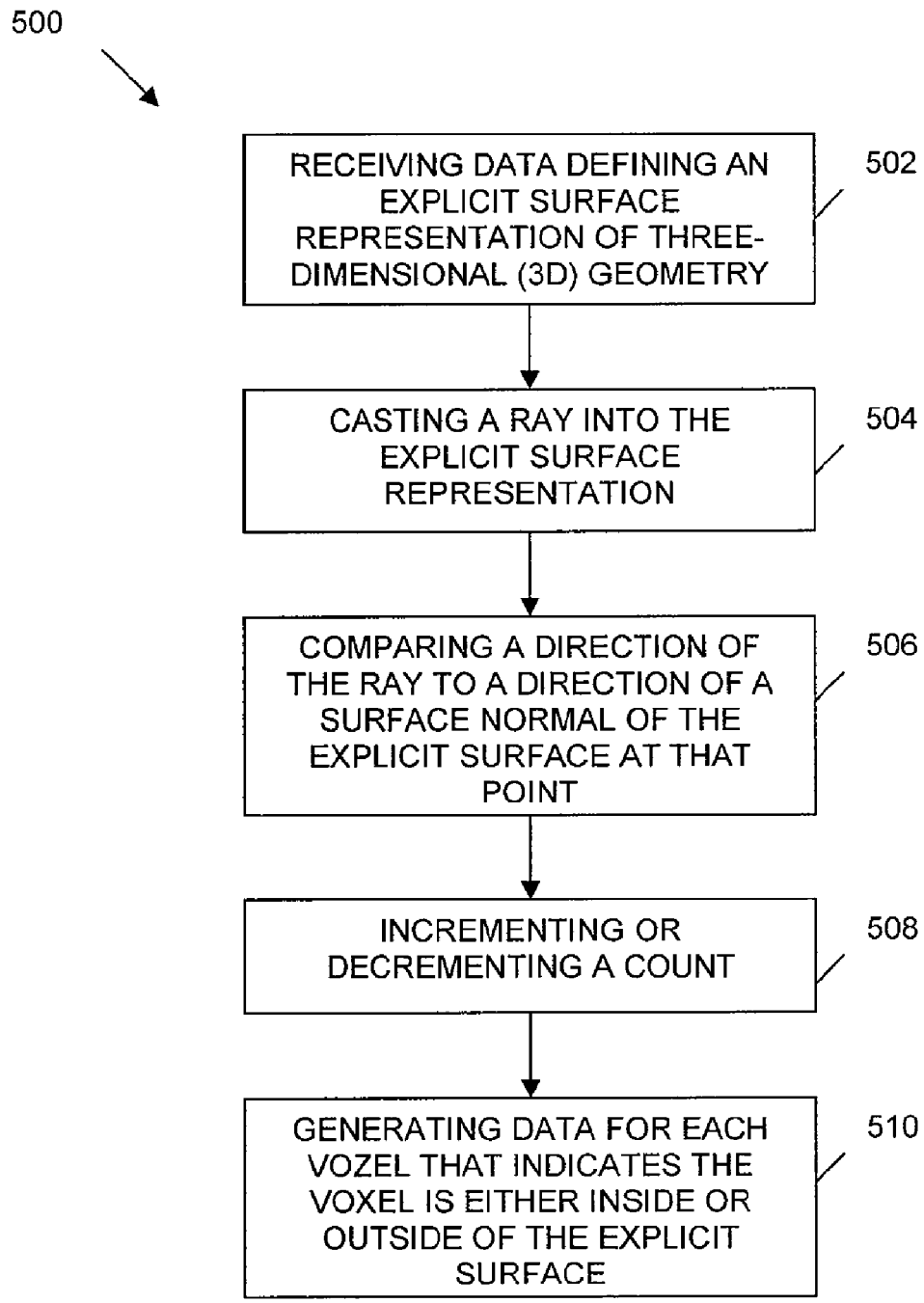
FIG. 5 is a flow diagram illustrating a method for use in computer graphics in accordance with an embodiment of the present invention.

FIG. 5 illustrates a method 500 for use in computer graphics in accordance with an embodiment of the present invention. The method 500 may be used for disambiguating inside/outside as described above. In step 502, data is received that defines an explicit surface representation of three-dimensional (3D) geometry. In step 504, a ray is cast into the explicit surface representation. In step 506, for each point where the ray intersects the explicit surface, a direction of the ray is compared to a direction of a surface normal of the explicit surface at that point. In step 508, for each point where the ray intersects the explicit surface, a count is incremented or decremented based on a first rule that uses a result of the comparison at that point. And in step 510, for one or more voxels corresponding to the ray, data is generated for each voxel that indicates the voxel is either inside or outside of the explicit surface based on a second rule that uses a value of the count at that voxel.

Figure 6:
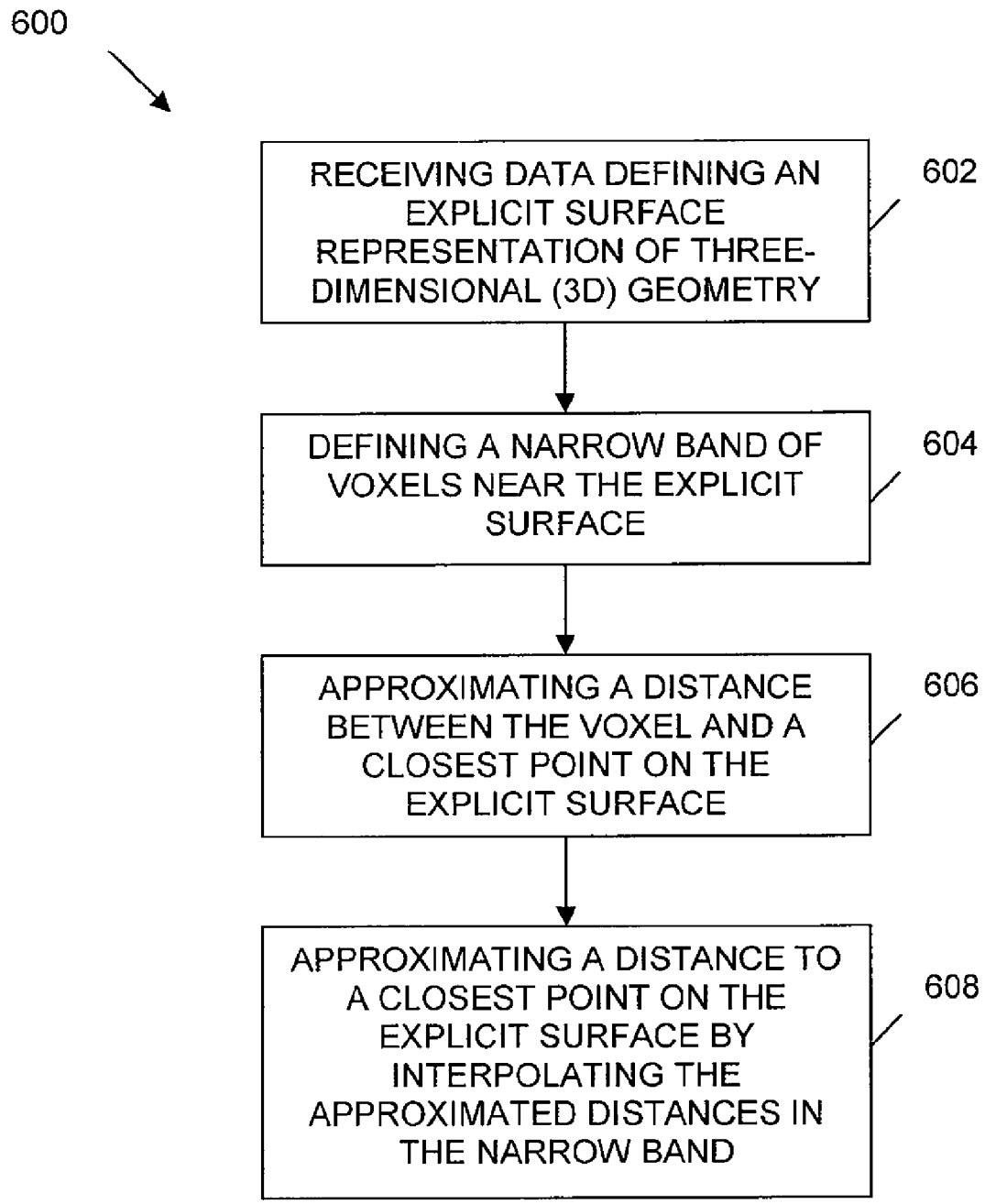
FIG. 6 is a flow diagram illustrating another method for use in computer graphics in accordance with an embodiment of the present invention.

FIG. 6 illustrates a method 600 for use in computer graphics in accordance with an embodiment of the present invention. The method 600 may be used for determining the distance between each voxel in the grid and the closest point on the surface of the polygonal surface as described above. In step 602, data is received defining an explicit surface representation of three-dimensional (3D) geometry. In step 604, a narrow band of voxels is defined near the explicit surface. In step 606, for each voxel in the narrow band, a distance between the voxel and a closest point on the explicit surface is approximated by assuming a set of two-dimensional (2D) distances associated with the voxel and a portion of the explicit surface form a triangle. And in step 608, for each voxel outside of the narrow band, a distance to a closest point on the explicit surface is approximated by interpolating the approximated distances in the narrow band.

As such, various features of some of the embodiments of the present invention may include, but are not limited to: looking at surface normals as part of disambiguating inside/outside; accumulating a count, or cardinality, based on the comparison of the directions of the ray and surface normals; the ability to use different rules to decide inside or outside based on the cardinality; and determining the actual 3D distances to the surface for voxels in a narrow band based on approximating the surface with a triangle.

Figure 7:
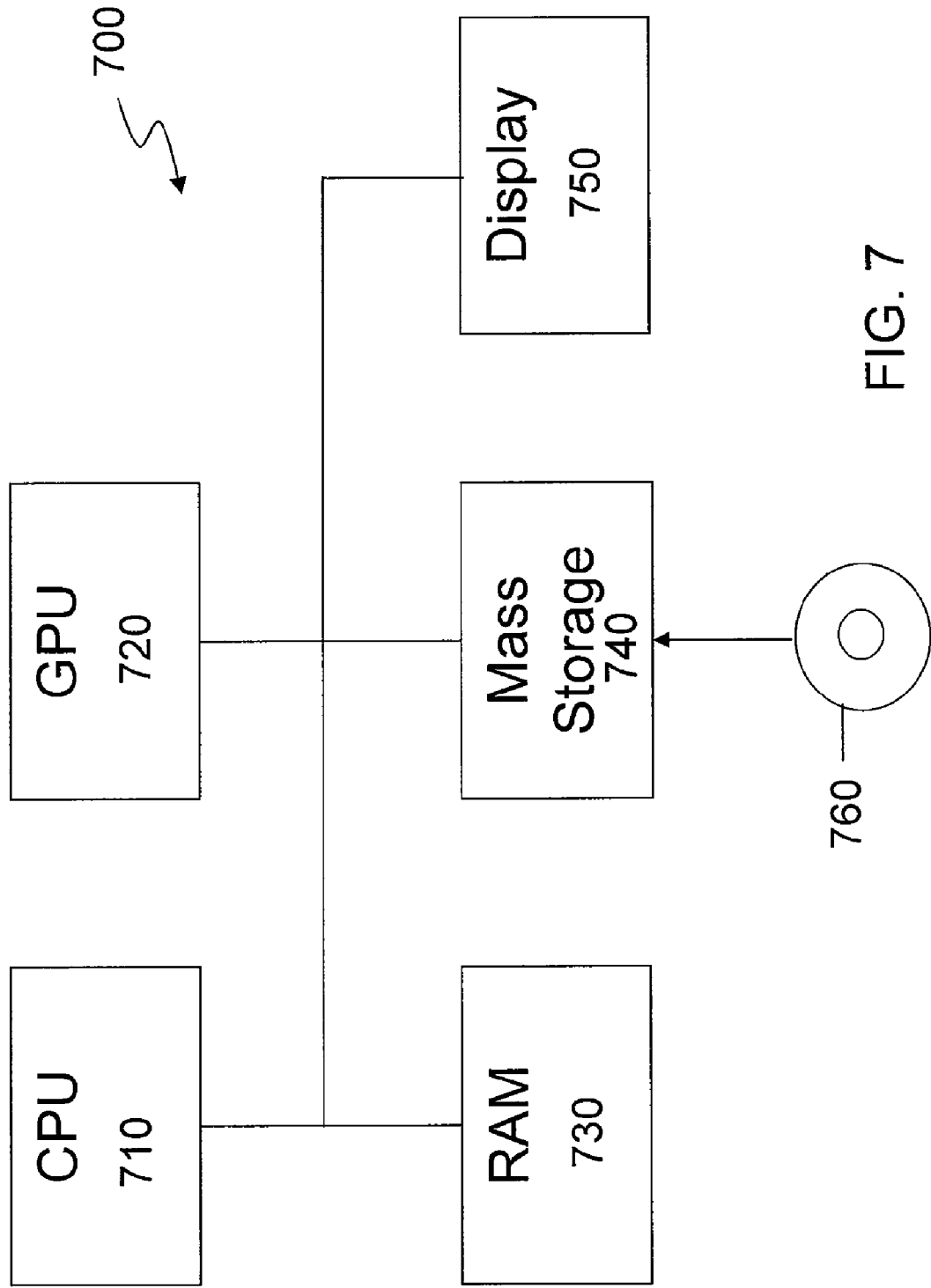
FIG. 7 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems. Referring to FIG. 7, there is illustrated a system 700 that may be used for any such implementations. One or more components of the system 700 may be used for implementing any system or device that, for example, converts polygonal surfaces to level sets, disambiguates between inside/outside, approximates 3D distances to the surface, etc., all as described above. However, the use of the system 700 or any portion thereof is certainly not required.

By way of example, the system 700 may include, but is not required to include, a central processing unit (CPU) 710, a graphics processing unit (GPU) 720, a random access memory (RAM) 730, and a mass storage unit 740, such as a disk drive, and a display 750. The system 700 comprises an example of a processor based system.

The CPU 710 and/or GPU 720 may be used to execute or assist in executing the steps of the methods and techniques described herein, and various program content, images, surfaces, animations, avatars, representations, communities, interfaces, etc. may be rendered on the display 750. Removable storage media 760 may optionally be used with the mass storage unit 740, which may be used for storing code that implements the methods and techniques described herein, such as code for converting polygonal surfaces to level sets as described above. However, any of the storage devices, such as the RAM 730 or mass storage unit 740, may be used for storing such code. For example, any of such storage devices may serve as a tangible computer storage medium for embodying a computer program for causing a computer, system, console, or other processor based system to execute or perform the steps of any of the methods, code, and/or techniques described herein. Furthermore, any of the storage devices, such as the RAM 730 or mass storage unit 740, may be used for storing any needed database(s).

In some embodiments, one or more of the methods and/or techniques described above may be implemented in a computer program executable by a processor based system. By way of example, a processor based system may comprise any type of system having one or more processors, such as the above-described system 700 or similar system, a computer, DVD player, Blu-ray disc player, entertainment system, game console, etc. Such computer program may be used for executing various steps and/or features of the above-described methods and/or techniques. In some embodiments, software modules within the computer program may be used for executing various steps and/or features of the above-described methods and/or techniques.

For example, a computer program in accordance with an embodiment of the present invention may implement a method for use in computer graphics, comprising: receiving data defining an explicit surface representation of three-dimensional (3D) geometry; casting a ray into the explicit surface representation; for each point where the ray intersects the explicit surface, comparing a direction of the ray to a direction of a surface normal of the explicit surface at that point; for each point where the ray intersects the explicit surface, incrementing or decrementing a count based on a first rule that uses a result of the comparison at that point; and for one or more voxels corresponding to the ray, generating data for each voxel that indicates the voxel is either inside or outside of the explicit surface based on a second rule that uses a value of the count at that voxel.

As another example, a computer program in accordance with an embodiment of the present invention may implement a method for use in computer graphics, comprising: receiving data defining an explicit surface representation of three-dimensional (3D) geometry; defining a narrow band of voxels near the explicit surface; for each voxel in the narrow band, approximating a distance between the voxel and a closest point on the explicit surface by assuming a set of two-dimensional (2D) distances associated with the voxel and a portion of the explicit surface form a triangle; and for each voxel outside of the narrow band, approximating a distance to a closest point on the explicit surface by interpolating the approximated distances in the narrow band.

Such computer programs may be stored or embodied in any type of computer readable storage or recording medium. By way of example, such computer readable storage medium may include, but is not limited to, any type of computer memory or storage, such as main memory, local memory, ROM, RAM, mass storage, hard disk drive, network storage, USB storage, Blu-ray disc, digital video disk (DVD), compact disk (CD), floppy disk, etc.

The above description is not to be taken in a limiting sense, but is made merely for the purpose of describing the general principles of exemplary embodiments. The scope of the invention should be determined with reference to the claims.

What is claimed is:

1. A method for use in computer graphics, comprising:
   receiving data defining an explicit surface representation of three-dimensional (3D) geometry;
   defining a narrow band of voxels near the explicit surface;
   for each voxel in the narrow band, approximating a distance between the voxel and a closest point on the explicit surface by assuming a set of two-dimensional (2D) distances associated with the voxel and a portion of the explicit surface form a triangle; and
   for each voxel outside of the narrow band, approximating a distance to a closest point on the explicit surface by interpolating the approximated distances in the narrow band;
   wherein a first of the two-dimensional (2D) distances associated with the voxel comprises a distance between the voxel and a first point on the explicit surface where a ray corresponding to a first scan line intersects both the voxel and the explicit surface; and
   wherein a second of the two-dimensional (2D) distances associated with the voxel comprises a distance between the voxel and a second point on the explicit surface where a ray intersects the explicit surface, wherein the ray corresponds to a scan line that is different than the first scan line;
   wherein the first and second two-dimensional (2D) distances form the legs of a right triangle and wherein the hypotenuse of the right triangle approximates a portion of the explicit surface, the distance from the voxel to the hypotenuse approximating the distance from the voxel to the closest point on the explicit surface.

2. The method of claim 1, wherein the interpolation is performed by a Fast Marching Method.

3. The method of claim 1 wherein a portion of the explicit surface self-intersects and defines a pocket in the representation.

4. A non-transitory computer readable storage medium storing a computer program executable by a processor based system, the computer program causing the processor based system to execute steps comprising:
   receiving data defining an explicit surface representation of three-dimensional (3D) geometry;
   defining a narrow band of voxels near the explicit surface;
   for each voxel in the narrow band, approximating a distance between the voxel and a closest point on the explicit surface by assuming a set of two-dimensional (2D) distances associated with the voxel and a portion of the explicit surface form a triangle; and
   for each voxel outside of the narrow band, approximating a distance to a closest point on the explicit surface by interpolating the approximated distances in the narrow band;
   wherein a first of the two-dimensional (2D) distances associated with the voxel comprises a distance between the voxel and a first point on the explicit surface where a ray corresponding to a first scan line intersects both the voxel and the explicit surface; and
   wherein a second of the two-dimensional (2D) distances associated with the voxel comprises a distance between the voxel and a second point on the explicit surface where a ray intersects the explicit surface, wherein the ray corresponds to a scan line that is different than the first scan line;

wherein the first and second two-dimensional (2D) distances form the legs of a right triangle and wherein the hypotenuse of the right triangle approximates a portion of the explicit surface, the distance from the voxel to the hypotenuse approximating the distance from the voxel to the closest point on the explicit surface.

5. The non-transitory computer readable storage medium of claim 4, wherein the interpolation is performed by a Fast Marching Method.

6. The non-transitory computer readable storage medium of claim 4 wherein a portion of the explicit surface self-intersects and defines a pocket in the representation.

\* \* \* \* \*